May 30, 1950      P. N. ZOLL      2,509,584
ANTITIPPING SAFETY ATTACHMENT FOR BABY CARRIAGES

Filed Feb. 3, 1949      5 Sheets-Sheet 1

INVENTOR.
PAUL N. ZOLL
BY
*Zoltan H. Polachek*
ATTORNEY

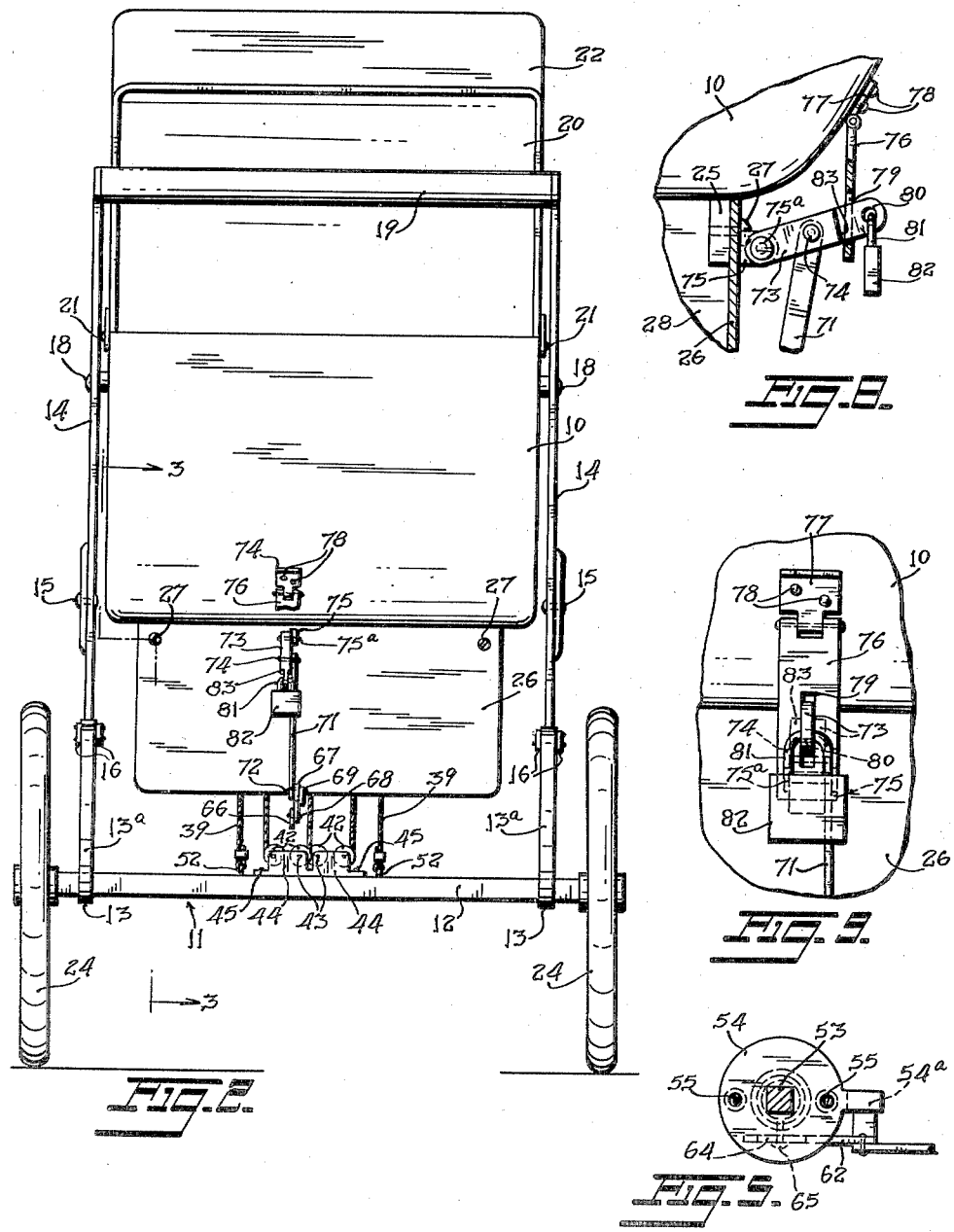

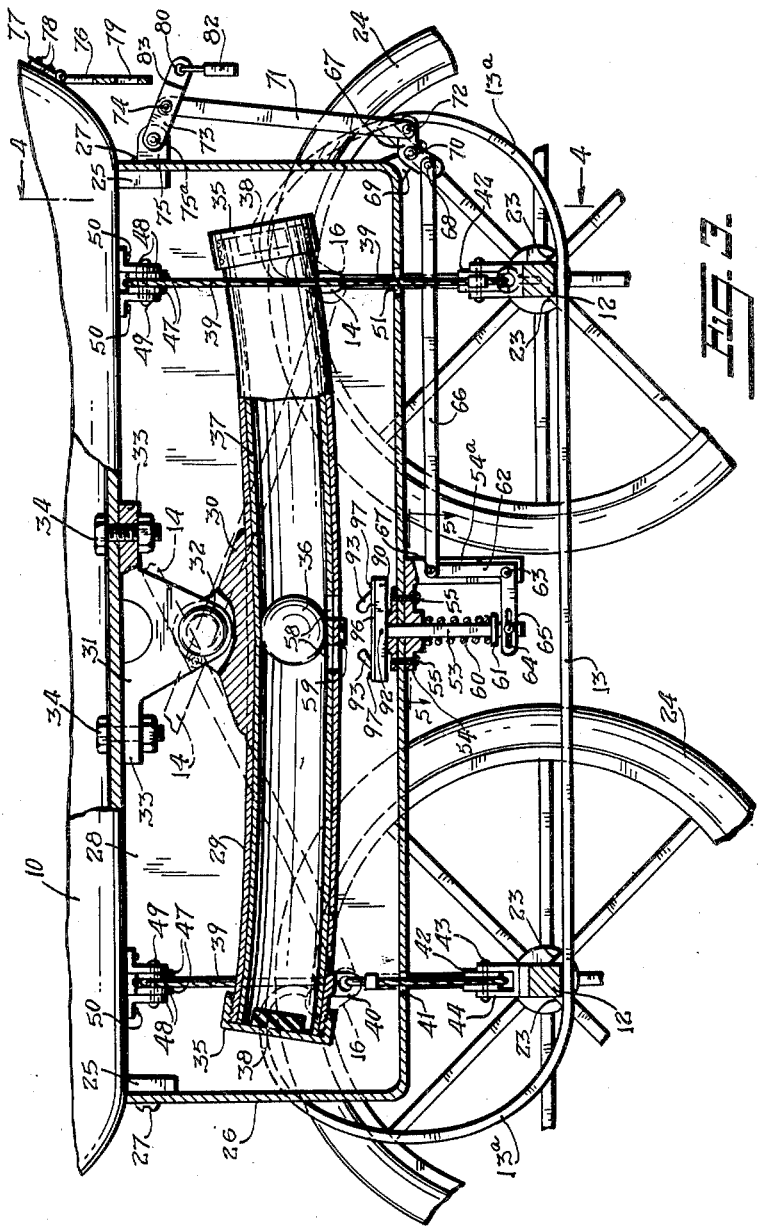

May 30, 1950          P. N. ZOLL          2,509,584
ANTITIPPING SAFETY ATTACHMENT FOR BABY CARRIAGES
Filed Feb. 3, 1949          5 Sheets-Sheet 4
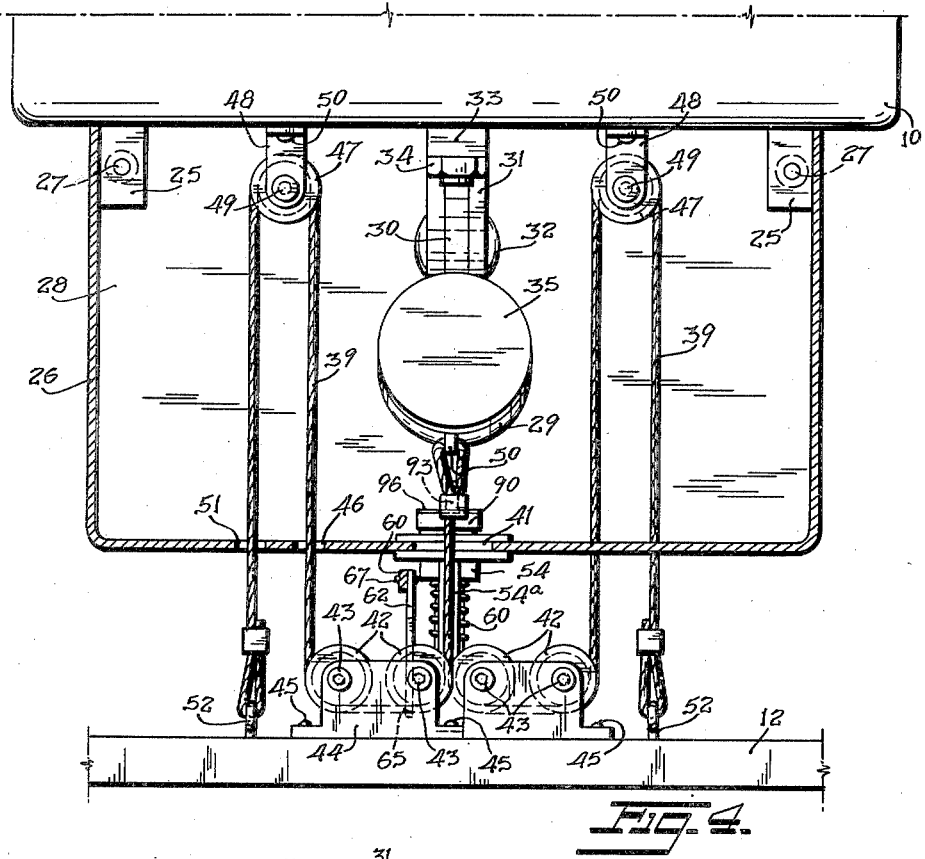
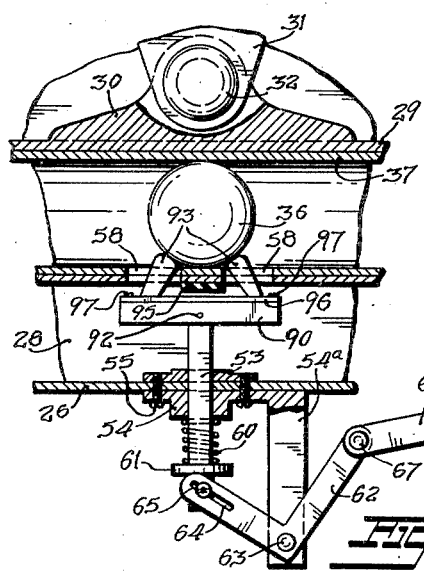
INVENTOR.
PAUL N. ZOLL
BY
ATTORNEY May 30, 1950            P. N. ZOLL            2,509,584

ANTITIPPING SAFETY ATTACHMENT FOR BABY CARRIAGES

Filed Feb. 3, 1949            5 Sheets—Sheet 5

INVENTOR.
PAUL N. ZOLL
BY
*Zoltan Holochek*
ATTORNEY

Patented May 30, 1950

2,509,584

UNITED STATES PATENT OFFICE 2,509,584

ANTITIPPING SAFETY ATTACHMENT FOR BABY CARRIAGES

Paul N. Zoll, Freeport, N. Y.

Application February 3, 1949, Serial No. 74,460

17 Claims. (Cl. 280—1)

The present invention relates to new and useful improvements in baby carriages, and is a refile of my abandoned application, Serial No. 661,602, filed April 12, 1946.

More specifically, the present invention relates to the construction of a baby carriage characterized by the provision of mechanism including a movable weight for off-setting the weight of the baby when in one end of the carriage body in a manner to prevent the carriage from tipping about the wheels as a fulcrum, at the end of the carriage where the child is located.

It is well known that children rapidly become so active that it is dangerous to leave them in baby carriages for fear that they will upset the carriages. In fact, after a child is about a year old, he is very likely to tip the carriage and severely injure himself. Accordingly, it is the purpose of the present invention to construct a baby carriage which will resist the tendency to tip about the wheels at either end of the carriage and so largely eliminate the danger of tipping caused by the activity of the child in the carriage.

It is further proposed to provide the carriage with a pivotally mounted tube having a weight freely rollable therein with means inter-connecting the tube and the carriage body in a manner so that movement of the child to one end of the carriage causing a lowering of that end to cause a reverse movement of the tube so that the ball will roll to the low end of the tube where its weight will offset the tendency to tip and retain the carriage in a substantially horizontal position.

It is a further object of the present invention to provide the tube with a two-degree curvature from end to end, with the ends of the tube turned upward in a manner so that the ball will assume a position at the low portion of the tube intermediate the ends thereof when the tube is in its horizontal position.

It is a further object of the present invention to provide means for holding the ball at an intermediate position within the tube in a manner to facilitate taking the carriage up and down stairways and while the carriage is in motion.

Another object of the present invention proposes mounting a sleeve of noise deadening material within the tube so that movements of the ball within the tube will be silenced.

A still further object of the present invention proposes the provision of removable end caps for closing the ends of the tube and which have resilient bumpers mounted on their inside faces in a manner to be engaged by the ball as it rolls to the ends of the tube.

It is a further object of the present invention to construct a baby carriage having a safety attachment in accordance with the present invention, which is simple and durable and which may be manufactured and sold at a reasonable cost.

For further comprehension of the invention, and of the objects and advantages thereof, reference will be had to the following description and accompanying drawings, and to the appended claims in which the novel features of the present invention are more particularly set forth.

In the accompanying drawings, forming a material part of this disclosure:

Fig. 2 is a front elevational view of the baby carriage looking from the right-hand side of Fig. 1.

Fig. 3 is an enlarged longitudinal vertical sectional view of a portion of the carriage taken on the line 3—3 of Fig. 2.

Fig. 4 is a partial transverse vertical sectional view taken on the line 4—4 of Fig. 3.

Fig. 5 is an enlarged partial horizontal sectional view taken on the line 5—5 of Fig. 3.

Fig. 6 is a view similar to a portion of Fig. 3 but illustrating a different position of the parts.

Fig. 8 is another view similar to a portion of Fig. 3 but illustrating a different position of the parts.

Fig. 9 is an end elevational view looking from the right-hand side of Fig. 7.

The baby carriage, according to the present invention, includes a carriage body 10 within which the child is adapted to be placed. The carriage body 10 is supported on an undercarriage 11 which includes a pair of square axles 12 extended transversely relative to the carriage body 10. The bottom faces of the axles 12 are secured to spaced longitudinal connecting bars 13 constructed of relatively flexible material. The ends of the connecting bars 13 are curved upward and inward forming springs 13ª.

Figure 1:
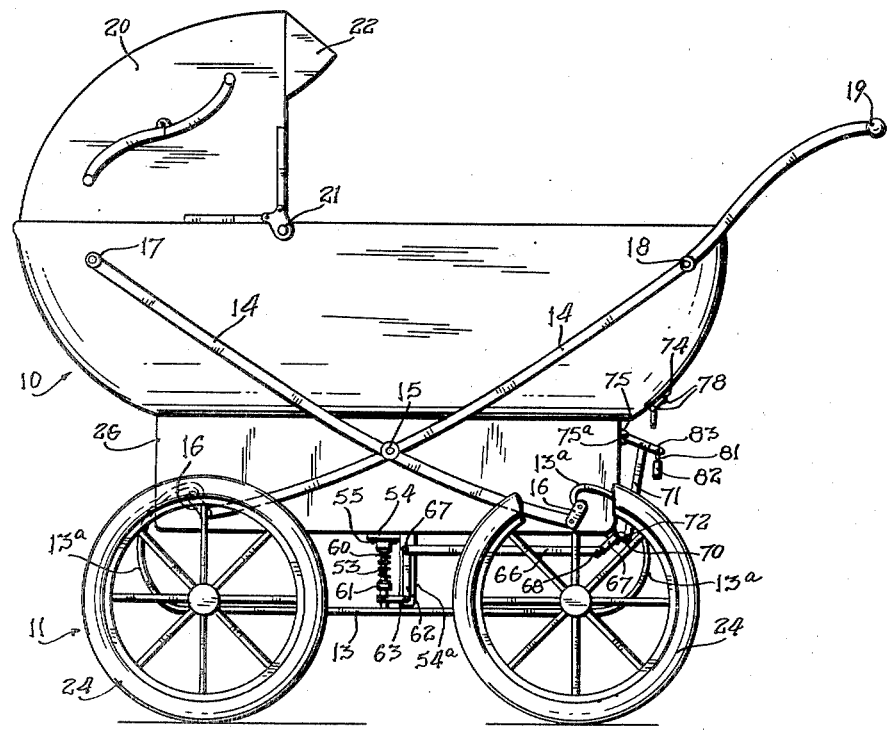
Fig. 1 is a side elevational view of a baby carriage having a safety attachment constructed in accordance with the present invention.

A pair of cross-arms 14, located one on each side of the carriage body 10, are connected together intermediate of their ends by means of pins 15. The lower ends of the cross-arms 14 are in turn pivotally connected to links 16, which links have their free ends pivotally connected to the free ends of the springs 13a, see Fig. 1. The top ends of the rearwardly extending cross-arms 14 are connected to the sides of the carriage body 10 by means of bolts 17. The cross-arms 14 which extend forwardly of the carriage body 10 are connected intermediate of their ends to the sides of the carriage body 10 by means of bolts 18. The forward ends of the forwardly extending cross-arms 14 continue upwardly and forwardly of the carriage body 10 and have a handle 19 mounted between the free ends thereof.

A hood 20 is pivotally mounted to assume an operative position over the rear portion of the carriage body 10, by means of pivoting pins 21. The forward part of the hood 20 is provided with the usual depending visor 22.

The axles 12 are secured to the connecting bars 13 so that the axles do not rotate, by being welded thereto as indicated at 23. The ends of the axles 12 extend beyond the sides of the connecting bars 13 and have the usual wheels 24 rotatively mounted on the ends thereof.

The foregoing details are conventional in baby carriage constructions and further description of those details will not be given in this specification as they are well known to those skilled in the art.

Depending from the bottom of the carriage body 10, there are four brackets 25 to which an open top casing 26 is removably attached by screws 27. Thus, the open top of the casing 26 is closed by the bottom of the carriage body 10 forming a compartment 28 beneath the carriage body.

Extended longitudinally within the compartment 28 midway between the sides thereof, there is a metallic tube 29 which has a two-degree bend from end to end, with the ends of the tube higher than the intermediate portion thereof. A lug 30 is integrally formed with the top of the tube 29 and is pivotally attached to a bracket 31 by a pivot pin 32. Ears 33 extend from opposite sides of the bracket 31 and are secured to the bottom wall of the carriage body 10 by nut and bolt assemblies 34.

The tube 29 is formed of metal and has its ends closed by removable caps 35 also formed of metal. A metallic ball 36 is freely rollable within the tube 29 and in the horizontal position of the tube, shown in Fig. 3, the ball 36 assumes an inoperative position at the low point of the tube 29 intermediate of its ends. As the tube 29 tilts in one direction or the other, the ball 36 will roll to the low end of the tube.

Mounted within the tube 29, there is a sleeve 37 of noise deadening material, to silence the rolling movement of the ball 36 within the tube 29. The sleeve 37 may be formed of rubber, leather or any other similar material. The inside faces of the caps 35 are provided with resilient bumpers 38 against which the ball 36 is adapted to engage when it rolls into either end of the tube 29. The resilient bumpers 38 are preferably formed of rubber.

Means is provided for reversely pivoting the tube 29 as either end of the carriage body 10 is lowered by movement of the child to that end of the carriage. The pivoting means is characterized by a cable 39 for each end of the tube 29. Each of the cables 39 has one of its ends secured to a depending lug 40 formed on the respective end of the tube 29. The cables 39 then pass downward through corresponding openings 41 formed in the bottom wall of the casing 26. The cables 39 then pass over complementary pairs of pulleys 42, see Fig. 4, rotatively supported by means of pins 43 in brackets 44. The brackets 44 are secured to the top faces of the respective axles 12 by means of rivets 45.

After leaving the pairs of pulleys 42, the cables 39 then pass upward through openings 46 formed in the bottom wall of the casing 26 and pass over pulleys 47. There is a single pulley 47 for each of the cables 39 and those pulleys 47 are rotatively supported in brackets 48 by means of pins 49. The brackets 48 are secured to the bottom face of the carriage body 10 by means of rivets 50. The free ends of the cables 39 then pass downward through openings 51 formed in the bottom wall of the casing 26. Those free ends of the cables 39 are then secured to eye-members 52 mounted on the axles 12.

The arrangement is such that if the baby within the carriage body 10 goes to either end thereof, that end of the carriage body 10 will move downward under the weight of the child while the opposite end thereof goes upward. The upward movement of the opposite end of the carriage body 10 will cause the pulley 47 at that end to move away from the corresponding eye-member 52 creating a pull on the corresponding cable 39 to pivot the tube 29 in the direction opposite to the direction in which the carriage body 10 moved, causing the ball 36 to roll to the low end of the tube. Such movement places the ball 36 on the side of the pivot pin 32 opposite the side on which the child is located. The weight of the ball 36 rolling to the low end of the tube 29 will offset the weight of the child and this added weight at the end of the carriage opposed to the end to which the child has gone will retain the carriage against tipping about the wheels 24 at the end of the carriage body 10 wherein the child is located.

Means is provided for holding the ball 36 in an inoperative position at the center of the tube 29 while leaving the tube 29 free to pivot. This means is characterized by a stem 53 vertically slidably supported in a bracket 54 secured to the bottom wall of the casing 26 by several screws 55. As shown in Fig. 5, the stem 53 is square in horizontal cross-section so that this stem does not rotate, but is free to slide vertically.

A casing 90 is mounted on the top end of the stem 53. The bottom of the casing 90 is formed with a recess 91 into which the top end of the stem 53 engages and a pin 92 passes from side to side of the casing 90 through the top end of the stem 53 securely mounting the casing on the top end of the stem 53.

A pair of opposed dogs 93 are pivotally supported on pins 94 within the casing 90 and project upward through elongated slots 95 formed in a cover 96 which closes the open top of the casing 90. The cover 96 is releasably retained in position on the casing 90 by removable screws 97. Each of the dogs 93 is formed with a depending tail portion 93a which engages a shoulder 98 formed within the casing 90. The shoulders 98 retain the dogs 93 from being pivoted in a direction away from one another.

Mounted within the casing 90 spaced slightly from the free edges of the tail portions 93a of the dogs 93, there are pins 99. Springs 100 have their intermediate portions wound about the pins 99 and one of their ends engaging the inside face of the end walls of the casing 90 and the other of their ends bearing against the tail portions 93ª of the dogs 93 to retain the tail portions 93ª in contact with the shoulders 98. The free top ends of the dogs 93 are arranged to be projected through elongated holes 58 formed in the bottom of the tube 29 and which holes are in normal vertical alignment with the dogs 93, when the tube 29 is in its horizontal position.

Normally, the top ends of the dogs 93 are completely retracted from the holes 58, as shown in Fig. 3, leaving the ball 36 free to roll within the tube 29 and the tube free to pivot. However, when the stem 53 is urged upwards, the top ends of the dogs 93 enter the bottom of the tube 29 through the elongated holes 58 and locate themselves on opposite sides of the ball 36, as shown in Fig. 6, to retain the ball 36 against rolling movements within the tube 29, but leaving the tube free for pivoting movement.

Pivotally mounting the dogs 93 leaves them free to pivot in the event the dogs 93 should enter the bottom of the tube 29 with the ball 36 in other than its central position. In such case, the ball 36 will eventually find its way back to the center of the tube 29 and will roll over the top of the respective dog 93 pivoting the same against the action of the respective spring 100. The springs 100 exert less force than the weight of the ball 36 so that the weight of the ball 36 is capable of pivoting either of the dogs 93 against the action of the springs 100. When the ball 36 is located between the dogs 93, as shown in Fig. 6, the dogs 93 are held against pivoting away from one another by the engagement of the tails 93ª of the dogs 93 with the shoulders 98 formed in the casing 90, so that the dogs 93 retain the ball against movement within the tube 29.

The holes 58 are somewhat longer than the length of the dogs 93, so that when the dogs 93 are in their operative position, shown in Fig. 6, the tube 29 is free for pivotal movement.

Secured to the bottom of the tube 29 between the holes 58, there is a small rubber bumper 59 normally spaced from the top face of the cover 96, in the operative position of the dogs 93. However, the rubber bumper 59 acts to prevent a metal to metal contact between the cover 96 and the tube 29 upon any excessive movement of either the cover 96 or the tube 29 toward one another.

The stem 53 is urged into a normal lowered position by means of an expansion spring 60 coaxially wound on the stem 53 and which operates between the bottom face of the bracket 54 and a flange 61 formed on the stem 53 adjacent the bottom end thereof. The spring 60 thus acts to retain the stem 53 in the lowered position shown in Fig. 3.

Means is provided for urging the stem 53 upward against the action of the spring 60. This means is characterized by a bell-crank 62 pivotally suported by means of a pin 63 upon a depending portion 54ª of the bracket 54. One arm of the bell-crank 62 extends along the side of the stem 53 at the bottom thereof and is formed with an elongated slot 64. A pin 65 extends laterally from the side of the stem 53 and engages the slot 64 for moving the stem 53 upward, when the bell-crank 62 is pivoted about the pin 63. The other arm of the bell-crank 62 is pivotally attached to one end of a link 66 by means af a pin 67. The opposite end of the link 66 is pivotally attached to one arm of a bell-crank 67 by means of a pin 68. The bell-crank 67 is turnably attached to a lug 69 formed on the casing 26, by means of a pivot pin 70.

A substantially vertically extended lever 71 has its lower end pivotally attached to the other arm of the bell-crank 67, by a pin 72. The top end of the lever 71 is pivotally attached to an intermediate portion of a pivotally mounted lever 73, by means of a pin 74. One end of the lever 73 is pivotally attached to a lug 75 formed on the casing 26, by means of a pivot pin 75ª. Thus, when the free end of the lever 73 is manually pivoted upward the bell-crank 62, through the medium of the intervening linkage, will be pivoted in a direction to urge the stem 53 upward against the action of the spring 60, to the position shown in Fig. 6, in which the free top ends of the dogs 93 will be disposed in the holes 58 and on opposite sides of the ball 36.

Figure 7:
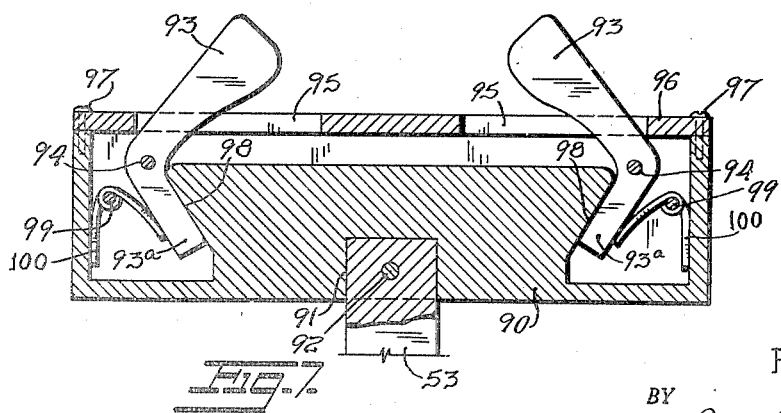
Fig. 7 is an enlarged longitudinal vertical sectional view of a portion of the ball locking means.

Means is provided for locking the pivotally mounted lever 73 in its raised position in which the dogs 93 will be in their operative positions. This means comprises a plate 76 pivotally attached to a second plate 77 secured to the adjacent end of the carriage body 10 by several rivets 78, see Fig. 8. The plate 76 is thus free to pivot relative to the plate 77 and is formed with an opening 79, see Figs. 3 and 7. In the raised position of the pivotally mounted lever 73, the free end thereof is arranged to be inserted into the opening 79 as shown in Fig. 7. The free end of the pivotally mounted lever 73 is provided with a hole 80 through which the shackle 81 of a conventional key-operated padlock 82 is adapted to be passed for retaining the free end of the pivotally mounted lever 73 in its engaged position with the opening 79. The free end of the lever 73 forward of the pivot pin 75ª, is formed with a shoulder 83 arranged to engage the back face of the plate 76 when the free end of the lever 73 is engaged in the opening 79.

Figure 10:
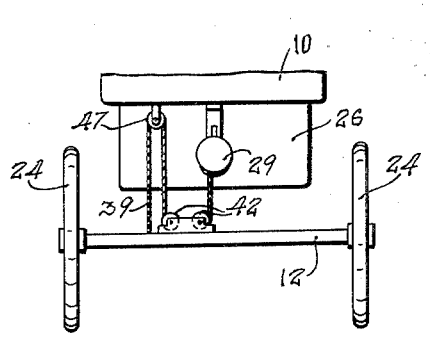
Figs. 10 and 11 are respectively diagrammatic end and side views showing the major parts of the carriage when in a normal horizontal position.
Figure 12:
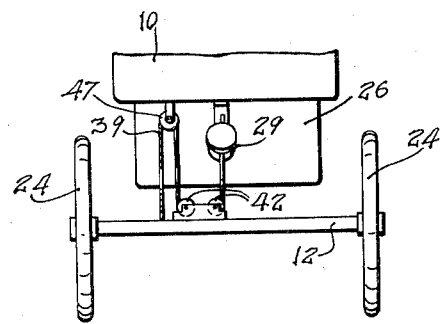
Figs. 12 and 13 are respectively diagrammatic end and side view showing the major parts of the carriage when tilted to one end.
Figure 11:
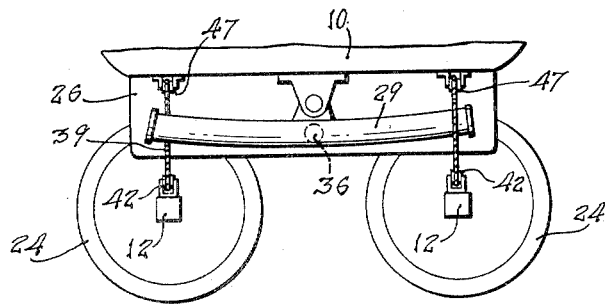
Figure 13:
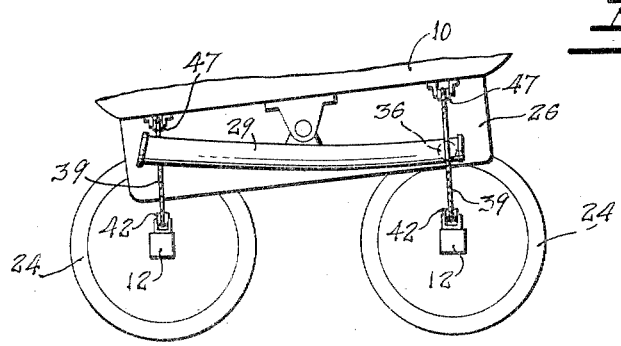

The operation of the baby carriage is as follows:

While the baby is peacefully resting in the carriage body 10, the parts will assume the position shown in Figs. 3, 10 and 11. However, upon the child becoming more active and moving to one end of the carriage body 10, that end will be lowered see Figs. 12 and 13 and the tube 29 will be pivoted, as previously described, to lower its opposite end, causing the ball 36 to roll to that lowered end of the tube 29. Such movement of the ball 36 will offset the weight of the child and retain the carriage against tilting about the wheels 24 at the low end of the carriage body 10.

When it is desired to lock the ball 36 in its inoperative position at the center of the tube 29, it is merely necessary to lift upward on the free end of the lever 73 to pivot the bell-crank 62 and urge the stem 53 upward against the action of the spring 60. Such upward movement of the stem 53 will cause the dogs 93 to move upward through the holes 58 to their operative positions on opposite sides of the ball 36, as shown in Fig. 6. The lever 73 can be locked in its raised position by passing the free end thereof through the opening 79 in the plate 76, and then engaging the padlock 82 with the hole 80 in the free end of the lever 73. It is appreciated, of course, that when the lever 73 is released, the tension on the spring 60 will return the parts to the inoperative position of the dogs 93, as shown in Fig. 3.

When the carriage is being pushed, the ball 36 is locked in its inoperative position at the center of the tube 29 to permit the carriage to be easily wheeled without interference from the ball 36 shifting its position within the tube 29. The elongated nature of the holes 58 will leave the carriage body 10 free for movement relative to the under-carriage 11. When the carriage is left unattended, the ball 36 should be free to roll within the tube 29 so that the child within the carriage cannot tip the same or so that a person leaning on the carriage body 10 will be unable to tip the carriage. If desired, the plate 76 can be provided with another opening, similar to the opening 79, for locking the device in the position shown in Fig. 3.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A safety baby carriage comprising a carriage body having an undercarriage mounted thereon by means of carriage springs, a weight containing means having a weight gravitationally longitudinally movable with respect thereto, means pivotally mounting said weight containing means on said body, said weight containing means being normally horizontal, and means inter-connecting the weight containing means and the carriage body for deflecting the weight containing means from the horizontal when the carriage body is deflected from the horizontal, the deflections of the carriage body and the weight containing means being in opposite directions.

2. A safety baby carriage comprising a carriage body having an undercarriage mounted thereon by means of carriage springs, a substantially horizontal member pivotally mounted on the carriage body and carrying a gravitationally longitudinally movable weight thereon, means interconnecting the horizontal member and the carriage body for deflecting the horizontal member from the horizontal position as the carriage body is deflected from the horizontal and in an opposite direction thereto.

3. A safety baby carriage comprising a carriage body having an undercarriage mounted thereon by means of carriage springs, a weight containing tube having a rolling weight therein, said tube being pivotally mounted on the carriage body normally parallel with the undercarriage, a cable interconnecting the carriage body and the tube and operating to deflect the tube from its parallel position with relation to the undercarriage when the carriage body is deflected from its angular position with respect to the undercarriage, the deflections of the tube and the body being in opposite directions.

4. A safety baby carriage comprising a carriage body having an undercarriage mounted thereon by means of carriage springs, a weight containing tube having a rolling weight therein, said tube being pivotally mounted on the carriage body normally parallel with the undercarriage, a cable interconnecting the carriage body and the tube, and passing around pulleys mounted on the undercarriage and operating to deflect the tube from its parallel position with relation to the undercarriage when the carriage body is deflected from its angular position with respect to the undercarriage, the deflections of the tube and the body being in opposite directions.

5. A safety baby carriage comprising a carriage body having an undercarriage mounted thereon by means of carriage springs, a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal.

6. A safety device for a baby carriage having a carriage body mounted on an undercarriage by means of springs, said device comprising a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal.

7. A safety baby carriage comprising a carriage body having an undercarriage mounted thereon by means of carriage springs, a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal, said tube being upwardly curved at each end, whereby said weight is normally maintained at the center of the tube when the tube is horizontal.

8. A safety device for a baby carriage having a carriage body mounted on an undercarriage by means of springs, said device comprising a tube pivotally mounted normally horizontally, on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal, said tube being upwardly curved at each end, whereby said weight is normally maintained at the center of the tube when the tube is horizontal.

9. A safety baby carriage comprising a carriage body having an undercarriage mounted thereon by means of carriage springs, a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal, said tube being upwardly curved at each end, whereby said weight is normally maintained at the center of the tube, and means for locking the tube in a substantially parallel position with respect to said carriage body.

10. A safety device for a baby carriage having a carriage body mounted on an undercarriage by means of springs, said device comprising a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal, said tube being upwardly curved at each end, whereby said weight is normally maintained at the center of the tube, and means for locking the tube in a substantially parallel position with respect to said carriage body.

11. A safety baby carriage comprising a carriage body having an undercarriage mounted thereon by means of carriage springs, a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal, said tube being upwardly curved at each end, whereby said weight is normally maintained at the center of the tube, and means for locking said weight in a substantially fixed position within said tube.

12. A safety baby carriage comprising a carriage body having an undercarriage mounted thereon by means of carriage springs, weight containing means comprising a hollow tube, a weight supported within said tube and gravitationally longitudinally movable with respect thereto, means pivotally mounting said weight containing means on said body, said weight containing means being normally horizontal, and means interconnecting the weight containing means and the carriage body for deflecting the weight containing means from the horizontal when the carriage body is deflected from the horizontal, the deflections of the carriage body and the weight containing means being in opposite directions, said tube being open at its ends, and caps removably mounted on the ends of said tube.

13. A safety baby carriage comprising a carriage body having an undercarriage mounted thereon by means of carriage springs, weight containing means comprising a hollow tube, a weight supported within said tube and gravitationally longitudinally movable with respect thereto, means pivotally mounting said weight containing means on said body, said weight containing means being normally horizontal, and means interconnecting the weight containing means and the carriage body for deflecting the weight containing means from the horizontal when the carriage body is deflected from the horizontal, the deflections of the carriage body and the weight containing means being in opposite directions, said tube being open at its ends, and caps removably mounted on the ends of said tube, and resilient bumpers mounted on the inside faces of said caps and against which said ball is adapted to strike as it rolls to the ends of said tube.

14. A safety baby carriage comprising a carriage body having an undercarriage mounted thereon by means of carriage springs, weight containing means comprising a hollow tube, a weight supported within said tube and gravitationally longitudinally movable with respect thereto, means pivotally mounting said weight containing means on said body, said weight containing means being normally horizontal, and means interconnecting the weight containing means and the carriage body for deflecting the weight containing means from the horizontal when the carriage body is deflected from the horizontal, the deflections of the carriage body and the weight containing means being in opposite directions, said tube being formed of metal, and a sleeve of noise deadening material mounted within said tube.

15. A safety baby carriage comprising a carriage body having an undercarriage mounted thereon by means of carriage springs, a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal, said tube being upwardly curved at each end, whereby said weight is normally maintained at the center of the tube, and means for locking said weight in a substantially fixed position within said tube, said locking means including a pair of pivotally mounted dogs for upward extension through elongated holes formed in the bottom of said tube to locate themselves on opposite sides of said ball.

16. A safety baby carriage comprising a carriage body having an undercarriage mounted thereon by means of carriage springs, a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal, said tube being upwardly curved at each end, whereby said weight is normally maintained at the center of the tube, and means for locking said weight in a substantially fixed position within said tube, said locking means including a pair of pivotally mounted dogs for upward extension through elongated holes formed in the bottom of said tube to locate themselves on opposite sides of said ball, said dogs being pivotally mounted to permit said ball to by-pass either of said dogs in the event said dogs enter said tube with said ball located to either side of said dogs.

17. A safety baby carriage comprising a carriage body having an undercarriage mounted thereon by means of carriage springs, a tube pivotally mounted normally horizontally on said carriage body, two cables, one at each end of said tube, each cable secured at one end to an end of said tube and secured at the other end to said undercarriage and passing around pulleys mounted on said carriage and said undercarriage, whereby rotation of the carriage body with respect to the undercarriage causes equal and opposite rotation of the tube with respect to said carriage, and a rolling weight within said tube adapted to roll to either end of the tube as the tube is rotated from the horizontal, said tube being upwardly curved at each end, whereby said weight is normally maintained at the center of the tube, and means for locking said weight in a substantially fixed position within said tube, said locking means including a pair of pivotally mounted dogs for upward extension through elongated holes formed in the bottom of said tube to locate themselves on opposite sides of said ball, and resilient means retaining said dogs in their operative position.

PAUL N. ZOLL.

REFERENCES CITED

The following references are of record in the file of this patent:

UNITED STATES PATENTS

| Number | Name | Date |
|---|---|---|
| 152,300 | McRay | June 23, 1874 |
| 1,277,434 | Leadbeater | Sept. 3, 1918 |
| 2,051,078 | Drechsel | Aug. 18, 1936 |

FOREIGN PATENTS

| Number | Country | Date |
|---|---|---|
| 304,607 | Great Britain | Dec. 19, 1929 |
| 600,958 | Germany | Aug. 4, 1934 |
| 762,604 | France | Jan. 22, 1934 |